United States Patent
Bomkamp et al.

(10) Patent No.: US 9,491,242 B2
(45) Date of Patent: Nov. 8, 2016

(54) SYSTEMS AND METHODS FOR SELECTING AND WIRELESSLY PROGRAMMING A MOTOR

(71) Applicant: Nidec Motor Corporation, St. Louis, MO (US)

(72) Inventors: Randy L. Bomkamp, Creve Coeur, MO (US); Scott M. Schroer, St. Charles, MO (US); Christopher D. Schock, O'Fallon, MO (US); Gregory A. Peterson, South Barrington, IL (US)

(73) Assignee: Nidec Motor Corporation, St. Louis, MO (US)

( * ) Notice: Subject to any disclaimer, the term of this patent is extended or adjusted under 35 U.S.C. 154(b) by 259 days.

(21) Appl. No.: 14/251,001

(22) Filed: Apr. 11, 2014

(65) Prior Publication Data
US 2015/0296050 A1 Oct. 15, 2015

(51) Int. Cl.
*G06F 15/16* (2006.01)
*H04L 29/08* (2006.01)

(52) U.S. Cl.
CPC .................................... *H04L 67/12* (2013.01)

(58) Field of Classification Search
None
See application file for complete search history.

(56) References Cited

U.S. PATENT DOCUMENTS

| | | | |
|---|---|---|---|
| 2009/0128067 A1* | 5/2009 | Mullin | H02K 11/33 318/400.01 |
| 2013/0227258 A1* | 8/2013 | Rumani | G05B 19/0426 713/1 |
| 2014/0077972 A1* | 3/2014 | Rathi | G07C 5/008 340/902 |
| 2014/0079564 A1* | 3/2014 | Becerra | F24F 11/04 417/53 |
| 2015/0121098 A1* | 4/2015 | Nicholson | G06F 1/3206 713/320 |

\* cited by examiner

*Primary Examiner* — Wing F Chan
*Assistant Examiner* — Padma Mundur
(74) *Attorney, Agent, or Firm* — Hovey Williams LLP (57) ABSTRACT

A system for wirelessly programming and diagnosing a motor includes a server computer system, a portable electronic device, and a wireless communication device. The server computer system stores motor operating parameters and other motor data that can be accessed by the portable electronic device over a wireless communication network for identifying a suitable replacement motor for an unserviceable motor. The server computer system also generates motor programming instructions for programming the replacement motor to emulate the unserviceable motor. The portable electronic device wirelessly transmits the motor programming instructions to the wireless communication device for storing the motor programming instructions on a memory of a controller of the replacement motor so that the replacement motor will emulate the unserviceable motor.

9 Claims, 4 Drawing Sheets

SYSTEMS AND METHODS FOR SELECTING AND WIRELESSLY PROGRAMMING A MOTOR

BACKGROUND

Motors used in heating, ventilation, air conditioning (HVAC) and fluid circulation systems often must be programmed to operate according to the specific needs of their systems and must be diagnosed when they do not operate properly. Currently, the motors are programmed using a specialized motor programming computer at a motor manufacturing facility, at the point of sale, or at an assembly plant. Programming a motor that is already onsite requires a technician to return the motor to the motor manufacturing facility or to another designated programming site that has the specialized motor programming computer. Similarly, motors at inventory sites that do not have a specialized motor programming computer must be sent back to the motor manufacturing facility to be programmed for their selected applications.

Motors also occasionally have to be replaced with new motors when they malfunction or otherwise quit working properly. Because motors are made in a variety of sizes and ratings, an onsite technician must stock many types of motors to ensure that he has the correct motor for the job. Otherwise, if he has an incorrect motor on hand, he must return to the inventory site to obtain the correct motor. This becomes very time consuming and costly over time considering the wide range of motor systems each requiring specific motor operating parameters.

In addition, a technician must carry many motor diagnostic tools and adaptors for interfacing with and servicing the different motors.

SUMMARY

The present invention solves the above-described problems and other problems by providing systems and methods for selecting and wirelessly programming, reprogramming, and diagnosing HVAC motors and other motors onsite or at the point of sale or inventory. The systems and methods of the present invention may be used with motors designed for HVAC systems, pumping systems, washing machines, dishwashers, or any other electrically powered devices or systems.

An embodiment of the present invention may be implemented with a motor programming system that comprises one or more server computers, a number of portable electronic devices, and a number of wireless communication devices. The server computers may be operated by or for a company that provides motor repair and motor replacement services and stores operating parameters and other data for a number of electric motors. The portable electronic devices may be operated by motor technicians and include a mobile motor servicing application stored thereon. The portable electronic devices communicate with the server computers via a wireless communication network. The wireless communication devices connect to the motors to be diagnosed, replaced, and/or programmed and wirelessly communicate with the portable electronic devices.

In use, a technician may carry a portable electronic device and a wireless communication device to a motor that needs to be replaced and may connect the wireless communication device to the motor. The technician may then establish a wireless connection between the portable electronic device and the wireless communication device. The portable electronic device may wirelessly retrieve motor information and motor operation history data from the motor via the wireless connection. The mobile motor servicing application on the portable electronic device may attempt to diagnose any motor issues and may generate a motor repair or motor servicing recommendation for the technician to fix the motor. If the motor is no longer operable and needs to be replaced, the portable electronic device may then transmit the motor information to one of the server computers over a wireless communication network so that the server computer can identify the motor.

The server computer then compares the motor information against the operating parameters and other data stored on its memory and recommends a replacement motor in the technician's inventory of motors that can be programmed to emulate the motor to be replaced. The server computer and/or the portable electronic device then generates or retrieves motor programming instructions and wirelessly transmits them to the wireless communication device. The wireless communication device then stores the motor programming instructions on a memory of a controller of the replacement motor so that the replacement motor emulates the replaced motor.

An embodiment of the wireless communication device includes a communication connector, a transceiver, and a communication controller. The communication connector connects the wireless communication device to the motor controller and includes pins, wires, or other adaptors. The transceiver receives signals from the motor controller via the communication connector and wirelessly transmits the signals to the portable electronic device. The transceiver also wirelessly receives signals from the portable electronic device for being sent to the motor controller via the communication connector. The communication controller directs the signals being sent between the transceiver and the motor controller.

An embodiment of the mobile motor servicing application for the portable electronic devices includes a graphical user interface that includes buttons, input boxes, and other user inputs and executable code for implementing the functions of the invention. For example, the executable code includes code segments for retrieving motor information such as motor type and horsepower rating from the motor, retrieving motor operating parameters and other data stored on a server computer system or stored in a memory on the portable electronic device, and identifying the motor by comparing the motor information and the motor parameters. Additional code segments may diagnose motor issues, generate an appropriate replacement motor recommendation, and reprogram the motor or the replacement motor based on motor programming instructions that the user inputs into the graphical user interface.

The present invention provides numerous advantages. For example, a technician, an aftermarket dealer, an original equipment manufacturer (OEM), or another person can program, reprogram, or diagnose a motor without returning it to a location with a specialized motor programming computer. A technician can also stock a small number of motors suitable for use in many motor systems and can program the motors at the jobsite via his portable electronic device. In addition, a technician can diagnose a motor via his portable electronic device and does not need to carry different types of diagnostic tools and adaptors.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present invention provide systems and methods for wirelessly diagnosing motors, wirelessly programming new motors, selecting replacement motors, and wirelessly programming replacement motors to emulate the operation of motors that are no longer serviceable. The systems and methods of the present invention may be used with motors designed for HVAC systems, refrigeration systems, washing machines, dishwashers, or any other electrically-powered devices or systems.

A technician using the systems and methods of the present invention to replace an original motor that can no longer be viably serviced may carry with him or in his service vehicle a small number of replacement motors from which he must be able to select the replacement motor that best or most effectively emulates the original motor. To select the correct replacement motor, the technician must be able to identify the original motor and/or its technical information and must have access to operating parameters and motor data of the replacement motors to which the original motor information may be compared. The systems and methods of the present invention wirelessly retrieve motor information from the original motor and wirelessly access operating parameters and motor data stored on server computer systems over a wireless communication network. The server computer systems make a replacement motor recommendation and transmit the motor recommendation to the technician's portable electronic device. The technician then uses the motor recommendation to select the replacement motor from the replacement motors on hand and replaces the original motor with the replacement motor. The technician then connects the wireless communication device to the replacement motor and establishes a wireless connection between the portable electronic device and the wireless communication device to wirelessly program the replacement motor to emulate the original motor.

The present invention may be used with any type of electronic motors. The motors may operate on direct current (DC) or alternating current (AC), may be synchronous or asynchronous, and may be single phase or three phase. The motor may be of any type, including but not limited to, permanent split capacitor (PSC) motors, brushed DC motors, switched reluctance motors, coreless or ironless DC motors, series wound universal motors, induction motors, torque motors, or stepper motors. Moreover, the motors may be fixed speed, multi-speed, or variable speed and may have any horsepower (HP) rating.

Each of the motors may have an integral or separate motor controller that provides power to and controls operation of its motor. Each motor controller may include any combination of circuitry, hardware, firmware, and/or software and may include an interface box such as an analog to digital translator. The interface box converts one type of connection point of the motor controller, such as a 4-wire communication port, to another type of connection point such as a 16-pin communication port.

The motors may need to be replaced with replacement motors that can be programmed to emulate the operating parameters of the motors to be replaced. One replacement motor may be programmable to replace 2, 5, 10, or more different types of motors. However, the principles of the present invention are not limited to any particular motor type, technology, or size.

Each replacement motor may have an integral or separate motor controller that provides power to and controls operation of the motor. Each motor controller may include any combination of circuitry, hardware, firmware, and/or software and may include an interface box for converting one type of connection point of the motor controller to another type of connection point.

Figure 1:
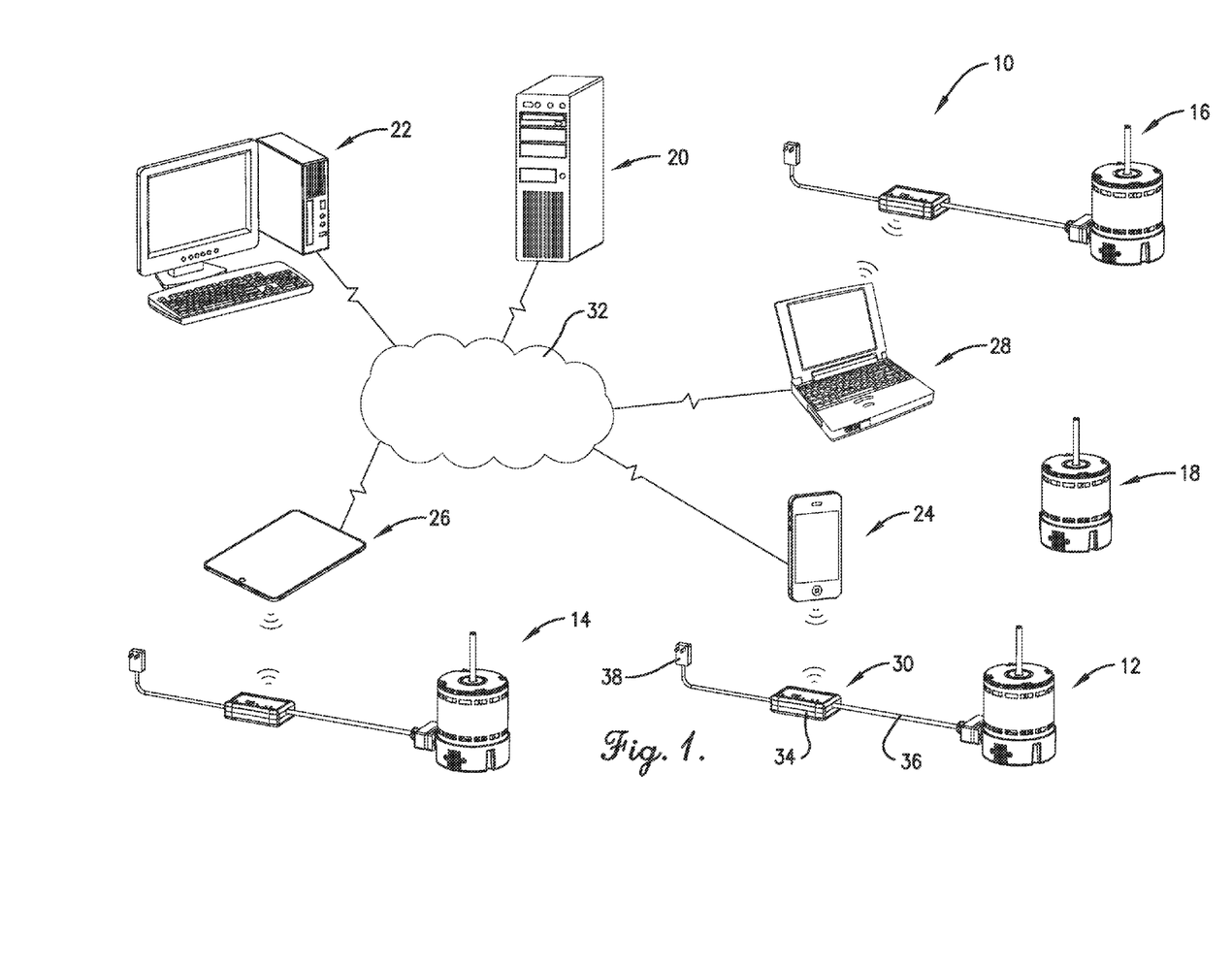
FIG. 1 is a schematic diagram of a motor programming system that may be used to wirelessly program and/or diagnose motors and to implement other aspects of the present invention.

Aspects of the present invention may be at least partially implemented with a motor programming system broadly referred to by the numeral 10 in FIG. 1. The motor programming system 10 is shown with original, new and replacement motors 12, 14, and 16 and a replacement motor 18 for replacing the original motor 12, but the principles of the invention are applicable to any number and type of motors.

The motor programming system 10 includes one or more server computers 20, 22, one or more portable electronic devices 24, 26, 28, one or more wireless communication devices 30, and a mobile motor servicing application. The server computers and portable electronic devices 24, 26, 28 in the motor programming system 10 may be operated by any persons or entities. For example, the server computers 20, 22 may be operated by a system administrator, and the portable electronic devices 24, 26, 28 may be operated by motor installers, service technicians, or homeowners who replace motors in HVAC systems, washing machines, dishwashers, or any other electrical device or system.

The components of the motor programming system 10 illustrated and described herein are merely examples of equipment that may be used to implement embodiments of the present invention and may be replaced with other equipment without departing from the scope of the present invention. Some of the illustrated components of the system 10 may also be combined and/or may be operated by the same persons or entities. Similarly, the aspects of the invention performed with the portable electronic devices 24, 26, 28 may be performed with the server computers 20, 22 and vice versa.

In more detail, the server computers 20, 22 are provided for storing motor operating parameters and other motor data for a number of motors. The server computers 20, 22 may also implement one or more computer programs for performing some of the functions described herein and may provide a web-based portal that can be accessed by the portable electronic devices 24, 26, 28 and other computers.

Embodiments of the server computers 20, 22 may include one or more servers running Windows; LAMP (Linux, Apache HTTP server, MySQL, and PHP/Perl/Python); Java; AJAX; NT; Novel Netware; Unix; Mac OS; or any other software system. The server computers 20, 22 include or have access to computer memory and other hardware and software for receiving, storing, accessing, and transmitting information via a wireless communication network 32 as described below. The server computers 20, 22 may also include conventional web hosting operating software, searching algorithms, and an Internet connection, and are assigned URLs and corresponding domain names so that they can be accessed via the Internet in a conventional manner.

The portable computing devices 24, 26, 28 may be any devices used by motor installers, service technicians, or others while programming, diagnosing, or replacing motors in HVAC systems or other electrically-powered devices or systems. The portable electronic devices 24, 26, 28 may be any type of mobile smartphone, handheld device, tablet, laptop computer, or portable gaming system. The portable electronic devices 24, 26, 28 each include a touch screen display or a similar screen with button inputs and further include computing hardware, software, memory, and wireless transmitting and receiving hardware and software. The portable electronic devices 24, 26, 28 each preferably include or can access an Internet browser and a conventional Internet connection such as a wireless broadband connection, DSL converter, or ISDN converter so that it can receive communications from the server computers 20, 22 via the communications network 32 described below.

Figure 2:
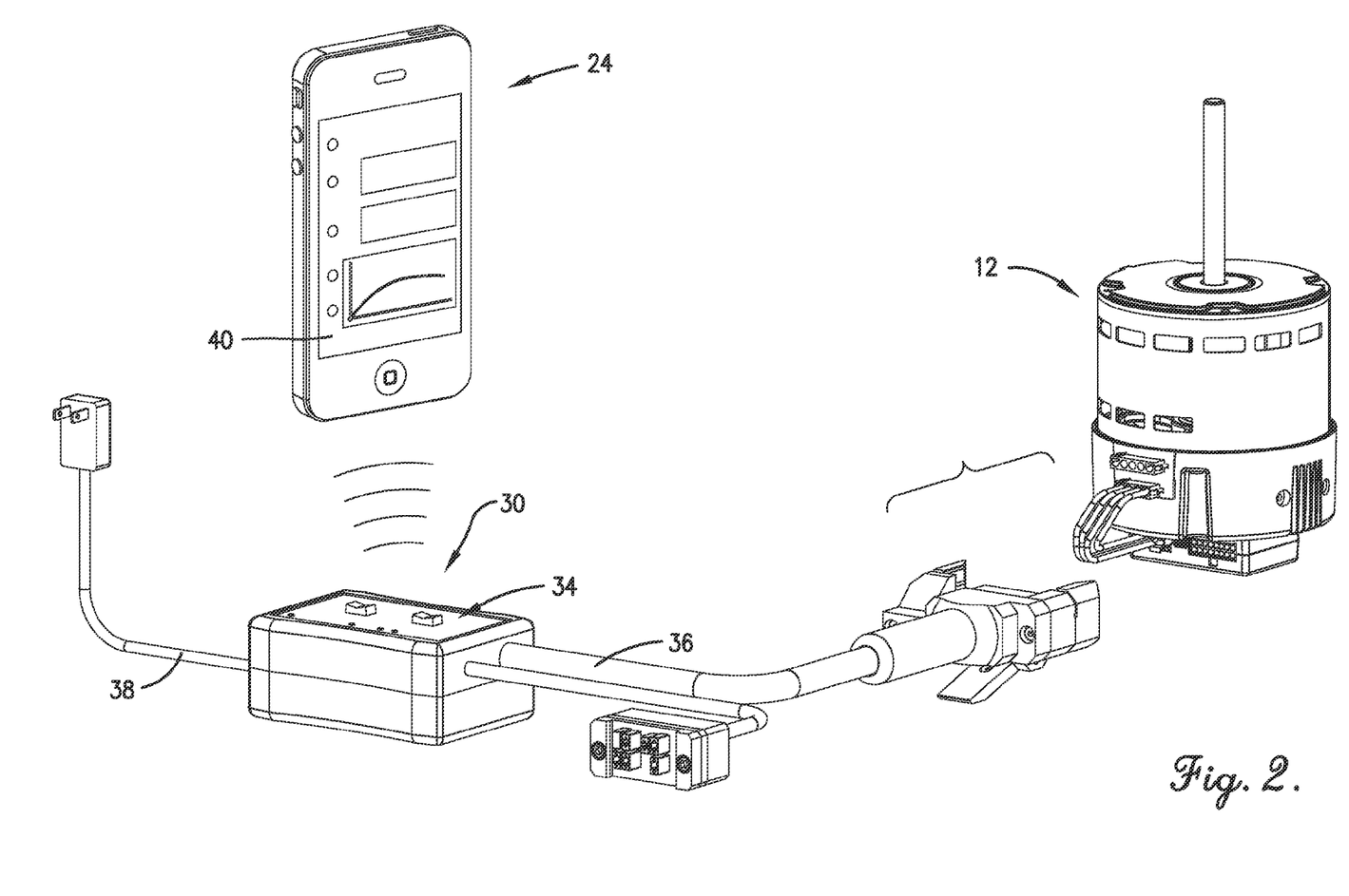
FIG. 2 is a schematic diagram of selected components of the motor programming system of FIG. 1.

The wireless communication device 30 wirelessly communicates with the portable electronic device 24 and includes a transceiver, a communication controller 34, a communication connector 36, and a power source 38, as shown in FIG. 2. The transceiver wirelessly transmits signals to and receiving signals from the portable electronic device 24 via a Bluetooth, radio frequency, 3G, 4G, 5G, or near field technology connection. The communication controller 34 directs the wireless signals received from the portable electronic device 24 and the signals sent from the motor controller of the motor 12 and may be a processor, a communication bus, a router, or other signal control device.

The communication connector 36 connects the wireless communication device 30 to the motor controller or the interface box of the motor 12 and includes cables, wires, pins, pin receivers, clips, plugs, or other connection points such as a 4-wire, 16-pin, or serial communication connector. The communication connector 36 may include two or more connecting points for connecting to different types of motors.

The power source 38 may be a power cord for plugging into a 120V or 240V wall outlet, a battery pack, or a usb or a proprietary portable electronic device cable. For example, the wireless communication device 30 may be plugged into a wall outlet or may be plugged into the portable electronic device 24 via a usb cable.

A mobile motor servicing application may be stored on each of the portable electronic devices 24, 26, 28. An embodiment of the mobile motor servicing application broadly includes a graphical user interface 40 and executable computer code for implementing aspects of the invention.

The graphical user interface 40 includes virtual images, text, text input boxes, checkboxes, buttons, and other user-selectable inputs. The graphical user interface 40 may have a layout that mimics the look of motor controls of the motor 12 or the interface box of the motor 12 and may also include user instructions in the form of text, icons, images, videos, and other visual cues.

The executable computer code is provided for implementing logical functions in the portable electronic devices 24, 26, 28 and can be embodied in any non-transitory computer-readable medium for use by or in connection with an instruction execution system, apparatus, or device, such as the portable electronic devices 24, 26, 28, a processor-containing system, or other system that can fetch the instructions from the instruction execution system, apparatus, or device, and execute the instructions. In the context of this application, a "non-transitory computer-readable medium" can be any non-transitory memory that can contain, store, or communicate the programs. The non-transitory computer-readable medium can be, for example, but not limited to, an electronic, magnetic, optical, electro-magnetic, infrared, or semi-conductor system, apparatus, or device. More specific, although not inclusive, examples of the non-transitory computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The mobile applications or computer programs may be distributed between portable electronic devices or may be downloaded from a virtual application marketplace such as the App Store and Google Play. The mobile motor servicing application may be stored on the non-transitory memory of the portable electronic devices 24, 26, 28 or may reside on one of the server computers 20, 22 and can be accessed over a wireless internet connection.

The communication network 32 is preferably the Internet but may be any other communication network such as a local area network, a wide area network, or an intranet. The communications network 32 may include or be in communication with a wireless network capable of supporting wireless communications such as the wireless networks operated by AT&T, Verizon, or Sprint. The communication network 32 may also be combined or implemented with several different networks.

Figure 3:
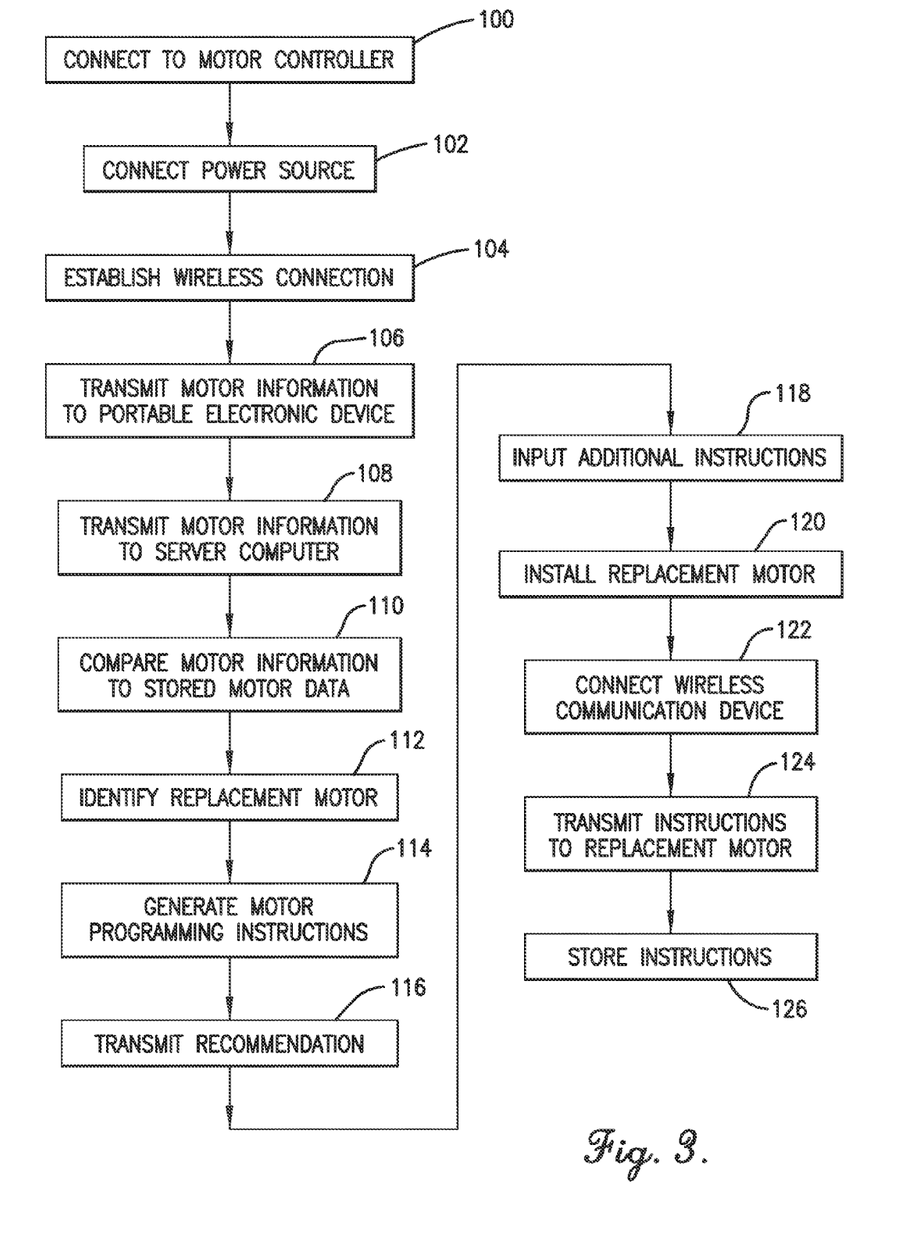
FIG. 3 is a flow diagram depicting steps in a method of the present invention.

A method of selecting and wirelessly programming a replacement motor 18 for replacing an original motor 12 via the system 10 will now be described with reference to the flow chart of FIG. 3. Some of the blocks of the flow chart may represent a step or steps in a method or a module segment or portion of code of the mobile applications and computer programs of the present invention. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

A service technician may first connect the communication connector 36 of the wireless communication device 30 to a connection point on the controller or the interface box of an original motor 12 that needs to be replaced, as shown in block 100. The connection point of the communication connector 36 that correctly interfaces with the connection point of the controller or the interface box of the motor 12 may need to be selected from the different connection points provided by the communication connector 36. For example, the 16-pin adaptor should be used to connect the wireless communication device 30 to a 16-pin communication port of the interface box.

The technician also plugs in or turns on the power source 38 of the wireless communication device 30, as shown in block 102.

The technician then establishes a wireless connection between the portable electronic device 24 and the wireless communication device 30, as shown in block 104. The mobile motor servicing application on the portable electronic device 24 may display an indication that a wireless connection has been made and may display a current status of the motor 12 such as "operational" or "standby".

The wireless communication device 30 then wirelessly transmits information about the motor 12 such as a model number, HP rating, input voltage, manufacturer name, and other motor information to the portable electronic device 24 over the Bluetooth or other wireless connection, as shown in block 106. The graphical user interface 40 of the portable electronic device 24 then displays the information.

The portable electronic device 24 then wirelessly transmits the motor information to one of the server computers 20, 22, as shown in block 108. The motor information may be transmitted automatically or after the technician initiates the motor information transmission.

The server computer 20 receives the motor information and compares the motor information to motor operating parameters and motor data of a number of motors stored on its memory to identify the original motor 12, as shown in block 110. For example, the server computer 20 may use a manufacturer name and a HP rating of the original motor 12 to determine a model number of the original motor 12.

The server computer 20 identifies a replacement motor or motors from the available replacement motors that most closely or most effectively can emulate the original motor 12 and generates a motor recommendation representative of the replacement motor, as shown in block 112. For example, the server computer 20 may identify a replacement motor that has the same input voltage as the original motor 12 and that has the smallest HP range that includes the HP rating of the original motor 12. The replacement motor recommendation may be a model number, a brand name, a motor operating parameter, or any other information that identifies a suitable replacement motor and may include installation instructions for aiding the technician in installing the replacement motor.

The server computer 20 also generates motor programming instructions based on the original motor information, as shown in block 114. Alternatively, the server computer 20 may retrieve motor programming instructions that have been designated for emulating the original motor 12. The motor programming instructions may be machine-readable computer data or may be in human readable form.

The server computer 20 then wirelessly transmits the replacement motor recommendation and the motor programming instructions to the portable electronic device 24, as shown in block 116.

The technician may input additional motor programming instructions into the mobile motor servicing application via the graphical user interface 40, as shown in block 118. The additional motor programming instructions may be used for overriding and/or supplementing parts of the motor programming instructions transmitted from the server computer 20.

The technician uses the replacement motor recommendation to select a replacement motor (e.g., replacement motor 18) and installs the replacement motor 18 in place of the original motor 12, as shown in block 120. The graphical user interface 40 of the mobile motor servicing application may then display the installation instructions transmitted with the replacement motor recommendation to aid the technician in installing the replacement motor 18.

The technician then connects the communication connector of the wireless communication device 30 to the connection point of the controller or the interface box of the replacement motor 18, as shown in block 122. The portable electronic device 24 or the wireless communication device 30 may indicate that the wireless communication device 30 is properly connected to the replacement motor 18.

The portable electronic device 24 then wirelessly transmits the motor programming instructions to the wireless communication device 30, which sends the motor programming instructions to the controller of the replacement motor 18, as shown in block 124.

The motor programming instructions are then stored on the memory of the replacement motor's controller, as shown in block 126. The replacement motor's controller will reference the motor programming instructions and will instruct the replacement motor 18 to operate in the same way as the original motor 12. For example, the controller may instruct the replacement motor 18 to operate at the same operating speed and torque as the original motor 12.

The above-described systems and methods for selecting and programming a replacement motor for replacing an original motor provide several advantages over conventional systems for selecting and programming replacement motors. For example, a technician can stock a few motors suitable for use in many applications and does not need to transport or have access to large inventories of motors for selecting a suitable replacement motor. The technician can use his own or a readily available portable electronic device to program the motor and does not need to take the motor to a location with a specialized motor programming computer.

An aftermarket dealer or an original equipment manufacturer (OEM) can also program the replacement motor at the point of purchase or at the point of assembly without sending the motor back to the manufacturing facility. Also, the aftermarket dealer or OEM can stock a few multi-purpose motors instead of stocking large inventories of limited purpose motors.

A method of wirelessly servicing a motor 12 via a mobile motor servicing application on the portable electronic device 24 will now be described in more detail. Some of the blocks of the flow chart may represent a step or steps in a method or a module segment or portion of code of the mobile applications and computer programs of the present invention. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

Figure 4:
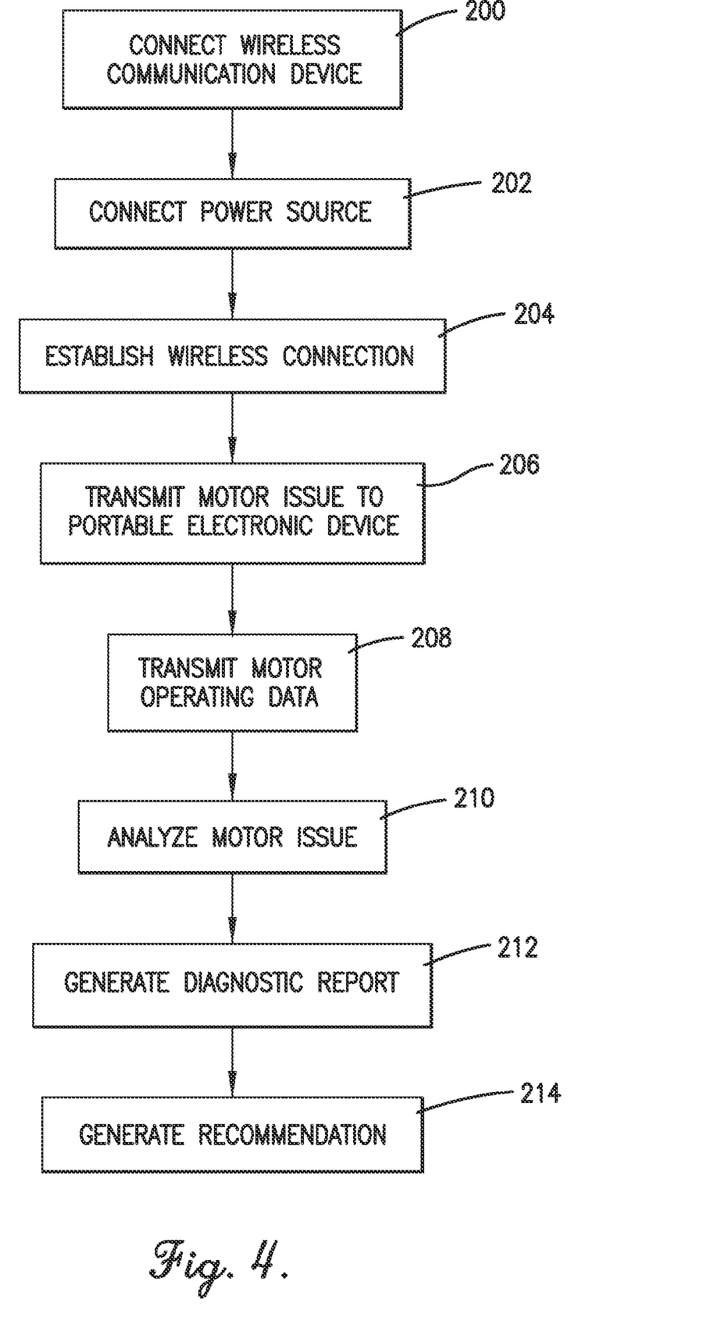
FIG. 4 is a flow diagram depicting steps in another method of the present invention.

A service technician may first connect the communication connector 36 of the wireless communication device 30 to a connection point on the controller or the interface box of an original motor 12 that needs to be serviced, as shown in block 200. The connection point of the communication connector 36 that correctly interfaces with the connection point of the controller or the interface box of the motor 12 may need to be selected from the different connection points provided by the communication connector 36. For example, the 16-pin adaptor should be used to connect the wireless communication device 30 to a 16-pin communication port of the interface box.

The technician also plugs in or turns on the power source 38 of the wireless communication device 30, as shown in block 202.

A wireless connection is then established between the portable electronic device 24 and the wireless communication device 30, as shown in block 204. The mobile motor servicing application on the portable electronic device 24 may display an indication that a wireless connection has been made.

The wireless communication device 30 transmits information about the motor such as a model number, HP rating, input voltage, manufacturer name, and other motor information to the portable electronic device 24 via the Bluetooth or other wireless connection. The graphical user interface 40 of the mobile motor servicing application may then display the motor information on the display screen of the portable electronic device 24.

The wireless communication device 30 then transmits a wireless signal representative of a motor controller error, a mechanical failure, an electrical failure, or other issue to the portable electronic device 24 over the Bluetooth or other wireless connection, as shown in block 206. The information in the wireless signal may be a nonhuman-readable diagnostic code or a proprietary code indicative of the motor issue.

The wireless communication device 30 may also transmit motor operating history data stored on the memory of the motor controller to the portable electronic device 24, as shown in block 208. The motor operating history data may contain useful diagnostic information about the performance of the motor 12 such as operating hours, peak voltages, and operating temperatures.

The mobile motor servicing application interprets and analyzes the wireless signal representative of the motor issue and the motor operating data to diagnose the motor issue, as shown in block 210. For example, the mobile motor servicing application may interpret a code in the wireless signal to represent an electrical short or an imbalanced motor. The mobile motor servicing application may compare recorded voltage data to determine that the motor 12 is frequently receiving overvoltages.

The mobile motor servicing application then generates an error message or a diagnostic report based on the above analysis and displays the error message or diagnostic report via the graphical user interface 40, as shown in block 212. For example, the error message may indicate that the motor issue could not be determined. The diagnostic report may indicate that the motor 12 is in danger of overheating or that the wiring insulation of the motor 12 may be at the end of its expected life cycle.

The mobile motor servicing application may also generate or retrieve from memory a recommendation for fixing or replacing the motor 12 based on the above analysis, as shown in block 214. The graphical user interface 40 of the mobile motor servicing application may display the recommendation on the display screen of the portable electronic device 24. Alternatively, the mobile motor servicing application may retrieve a recommendation for fixing or replacing the motor 12 from its memory or the memory of a server computer that has been determined to be the best solution for fixing or replacing the motor 12.

The above-described systems and methods for wirelessly servicing motors via a portable electronic device 24 provide several advantages over conventional systems for servicing motors. For example, a technician can diagnose a motor without carrying different types of motor diagnostic tools and adaptors because the communication connector 36 is compatible with many motor controller connection types.

A person such as a homeowner can also use the systems and methods of the present invention to diagnose the motor without requesting the assistance of a technician. This allows the homeowner to immediately address critical HVAC or pump issues such as when a heater motor malfunctions during the winter.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A motor programming system for programming a motor, the system comprising:
   a server computer system including a non-transitory computer readable medium for storing identification information for a number of original motors thereon;
   a wireless communication device configured to be connected to an original motor, the wireless communication device comprising:
   a transceiver configured to receive and transmit signals;
   a communication controller configured to direct signals between the controller of the motor and other electronic devices;
   a communication connector configured to connect the wireless communication device to the controller of the motor via an interface box of the motor for carrying signals therebetween, the communication connector including at least two different types of connector ends for connecting to at least two different types of motor connection points; and
   a power source configured to provide power to the wireless communication device;

a portable electronic device configured to transmit the motor information to the server computer system over a wireless communication network after the wireless communication device transmits the motor information to the portable electronic device; and a program stored on the non-transitory computer readable medium and configured to identify a motor type of the original motor, to generate a replacement motor recommendation based on the original motor type, and to instruct the server computer system to transmit the replacement motor recommendation to the portable electronic device over the wireless communication network so that a technician can retrieve an appropriate replacement motor.

2. The system of claim 1, wherein the program is further configured to generate motor programming instructions and to transmit the motor programming instructions to the portable electronic device over the wireless communication network;

wherein the portable electronic device is further configured to wirelessly transmit the motor programming instructions to the wireless communication device; and wherein the wireless communication device is further configured to send the motor programming instructions to a memory of a controller of the replacement motor so that the replacement motor will emulate performance characteristics of the original motor.

3. The system of claim 1, further comprising a mobile motor servicing application stored on a non-transitory computer readable medium of the portable electronic device, the mobile motor servicing application including a graphical user interface for inputting motor programming instructions therein, the portable electronic device being further configured to wirelessly transmit the motor programming instructions to the wireless communication device; and the wireless communication device being further configured to send the motor programming instructions to a memory of a controller of the replacement motor so that the replacement motor will emulate performance characteristics of the original motor.

4. The system of claim 1, wherein the portable electronic device and the wireless communication device are configured to communicate with each other over the wireless communication network.

5. The system of claim 1, wherein the portable electronic device and the wireless communication device are configured to communicate with each other via Bluetooth wireless technology.

6. The system of claim 1, wherein the portable electronic device and the wireless communication device are configured to communicate with each other via a wireless internet connection.

7. The system of claim 1, wherein the portable electronic device and the wireless communication device are configured to communicate with each other via a 3G, 4G, or 5G mobile communication network.

8. The system of claim 1, wherein the identification information is selected from the group consisting essentially of motor type, motor rating, motor horsepower, model number, and manufacturer.

9. The motor programming system of claim 1, wherein the communication connector includes a 16-pin connection end for connecting to a 16-pin connection point on the interface box of the motor.

* * * * *